US011461015B2

(12) United States Patent
Corey et al.

(10) Patent No.: US 11,461,015 B2
(45) Date of Patent: Oct. 4, 2022

(54) AVAILABLE STORAGE SPACE IN A SYSTEM WITH VARYING DATA REDUNDANCY SCHEMES

(71) Applicant: NetApp, Inc., Sunnyvale, CA (US)

(72) Inventors: Christopher Clark Corey, Boulder, CO (US); Daniel David McCarthy, Erie, CO (US); Sneheet Kumar Mishra, Lafayette, CO (US); Austino Nicholas Longo, Lafayette, CO (US)

(73) Assignee: NetApp, Inc., San Jose, CA (US)

( * ) Notice: Subject to any disclaimer, the term of this patent is extended or adjusted under 35 U.S.C. 154(b) by 184 days.

(21) Appl. No.: 16/601,978

(22) Filed: Oct. 15, 2019

(65) Prior Publication Data

US 2020/0117372 A1    Apr. 16, 2020

Related U.S. Application Data

(60) Provisional application No. 62/745,483, filed on Oct. 15, 2018.

(51) Int. Cl.
*G06F 11/08*    (2006.01)
*G06F 3/06*    (2006.01)
(Continued)

(52) U.S. Cl.
CPC ............ *G06F 3/0619* (2013.01); *G06F 3/064* (2013.01); *G06F 3/067* (2013.01); *G06F 3/0653* (2013.01);
(Continued)

(58) Field of Classification Search
CPC ........ G06F 3/0619; G06F 3/064; G06F 3/065; G06F 3/0652; G06F 3/067; G06F 11/10;
(Continued)

(56) References Cited

U.S. PATENT DOCUMENTS 7,873,782 B2    1/2011    Terry et al.
8,392,791 B2    3/2013    Saliba et al.
(Continued)

FOREIGN PATENT DOCUMENTS

CN    105630423 A    6/2016
CN    103944981 B    3/2017
WO    WO2017107095 A1    6/2017

OTHER PUBLICATIONS

International Preliminary Report on Patentability for Application No. PCT/US2019/056236, dated Apr. 29, 2021, 10 pages.
(Continued)

*Primary Examiner* — Ilwoo Park
(74) *Attorney, Agent, or Firm* — Jaffery Watson Mendonsa & Hamilton LLP

(57) ABSTRACT

A technique is configured to provide various data protection schemes, such as replication and erasure coding, for data blocks of volumes served by storage nodes of a cluster configured to perform deduplication of the data blocks. Additionally, the technique is configured to ensure that each deduplicated data block complies with data redundancy guarantees of the data protection schemes, while improving storage space of the storage nodes. In order to satisfy the data integrity guarantees while improving available storage space, the storage nodes perform periodic garbage collection for data blocks to optimize storage in accordance with currently applicable data protection schemes.

20 Claims, 8 Drawing Sheets

(51) Int. Cl.
*G06F 9/50* (2006.01)
*G06F 11/10* (2006.01)
*G06F 11/14* (2006.01)
*G06F 11/30* (2006.01)

(52) U.S. Cl.
CPC ............ *G06F 9/5083* (2013.01); *G06F 11/10* (2013.01); *G06F 11/1489* (2013.01); *G06F 11/3006* (2013.01); *G06F 11/3034* (2013.01)

(58) Field of Classification Search
CPC ............ G06F 11/1076; G06F 11/1088; G06F 11/1489; G06F 11/1492; G06F 11/2056–2069; G06F 11/2089; G06F 11/2094; G06F 11/3006; G06F 11/3034
USPC ........... 711/111–114, 161–162; 714/6.1–6.32
See application file for complete search history.

(56) References Cited

U.S. PATENT DOCUMENTS

| | | | |
|---|---|---|---|
| 8,683,296 B2 | 3/2014 | Anderson et al. | |
| 8,751,765 B2 | 6/2014 | Nakamura | |
| 8,850,108 B1 | 9/2014 | Hayes et al. | |
| 8,930,612 B2 | 6/2015 | Goss et al. | |
| 9,098,519 B2 | 8/2015 | Pavlov et al. | |
| 9,148,174 B2* | 9/2015 | Baker ................... | G06F 3/0605 |
| 9,201,733 B2 | 12/2015 | Verma et al. | |
| 9,367,243 B1 | 6/2016 | Hayes et al. | |
| 9,535,802 B2 | 1/2017 | Tsafrir et al. | |
| 9,690,657 B2 | 6/2017 | Iliadis et al. | |
| 9,710,165 B1 | 7/2017 | Lherault et al. | |
| 9,727,437 B2 | 8/2017 | Reinart | |
| 9,772,789 B1 | 9/2017 | Natanzon et al. | |
| 9,792,043 B2 | 10/2017 | Subramanian et al. | |
| 9,817,715 B2 | 11/2017 | Slik | |
| 9,817,750 B2 | 11/2017 | Hayes et al. | |
| 9,858,325 B1 | 1/2018 | Suver et al. | |
| 9,921,910 B2 | 3/2018 | Sangamkar et al. | |
| 9,959,284 B2 | 5/2018 | Zhuang et al. | |
| 10,061,798 B2 | 8/2018 | Colgrove et al. | |
| 2015/0149423 A1* | 5/2015 | Kiselev ............... | G06F 11/2064 |
| | | | 707/694 |
| 2015/0278243 A1 | 10/2015 | Vincent et al. | |
| 2016/0246676 A1 | 8/2016 | Bakre et al. | |
| 2016/0253114 A1 | 9/2016 | Deguchi | |
| 2017/0017547 A1 | 1/2017 | Broede et al. | |
| 2017/0177266 A1* | 6/2017 | Doerner ............... | G06F 12/0261 |
| 2018/0054217 A1 | 2/2018 | Schwaderer | |
| 2018/0060169 A1 | 3/2018 | Hussain et al. | |
| 2018/0173442 A1 | 6/2018 | Kirkpatrick et al. | |
| 2018/0181330 A1 | 6/2018 | Kusters et al. | |
| 2019/0042365 A1* | 2/2019 | Malone ............... | H03M 13/154 |
| 2020/0057699 A1* | 2/2020 | Juniwal ............... | G06F 11/3409 |
| 2020/0104153 A1* | 4/2020 | Shibayama ............ | G06F 3/067 |

OTHER PUBLICATIONS

PCT Notification of Transmittal of the International Search Report and the Written Opinion of the International Searching Authority, or the Declaration, International Searching Authority, International Application No. PCT/US2019/056200, dated Dec. 13, 2019, 12 pages.

PCT Notification of Transmittal of the International Search Report and the Written Opinion of the International Searching Authority, or the Declaration, International Searching Authority, International Application No. PCT/US2019/056236, dated Mar. 9, 2019, 30 pages.

Tang et al., "An Efficient Data Location Protocol for Self-organizing Storage Clusters," Proceedings of ACME/IEEE SC/2003 Conference, 13 pages.

Aguilera, M.K., "*Using Erasure Codes Efficiently for Storage in a Distributed System,*" IEEE 2005 International Conference on Dependable Systems and Networks (DSN'05), 11 pages.

* cited by examiner

US 11,461,015 B2

AVAILABLE STORAGE SPACE IN A SYSTEM WITH VARYING DATA REDUNDANCY SCHEMES

CROSS-REFERENCE TO RELATED APPLICATIONS

The present application claims the benefit of U.S. Provisional Patent Application Ser. No. 62/745,483, which was filed on Oct. 15, 2018, by Christopher Clark Corey et al. for Maximizing Available Storage Space in a System with Varying Replication Schemes, and is related to U.S. patent application Ser. No. 16/545,992, which was filed on Aug. 20, 2019, by Daniel David McCarthy et al. for Erasure Coding Content Driven Distribution of Data Blocks which are hereby incorporated by reference.

BACKGROUND

Technical Field

The present disclosure relates to protection of data served by storage nodes of a cluster and, more specifically, to protection of data while improving storage space efficiency of the data served by the storage nodes of the cluster.

Background Information

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as logical volumes (volumes) accessible as logical units (LUNs). Each volume may be implemented as a set of data structures, such as data blocks that store data for the volume and metadata blocks that describe the data of the volume. For example, the metadata may describe, e.g., identify, storage locations on the devices for the data.

Specifically, a volume, such as a LUN, may be divided into data blocks. To support increased durability of data, the data blocks may be replicated among the storage nodes. That is, to ensure data integrity (availability) in the event of node failure, a redundancy scheme, such as duplicating blocks, may be employed within the cluster. To improve storage efficiency, a data redundancy method other than duplication, such as erasure coding, may be used. Unlike data duplication where no data is encoded and one or more copies of a data block are obtainable from non-failed nodes, some of the data is encoded with erasure coding and used for reconstruction in the event of node failure. However, support for a same level of data integrity within the cluster for both replication redundancy and erasure coded redundancy may be inefficient for storage space. Such inefficiency may be compounded when the level of data redundancy is different between the redundancy schemes.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
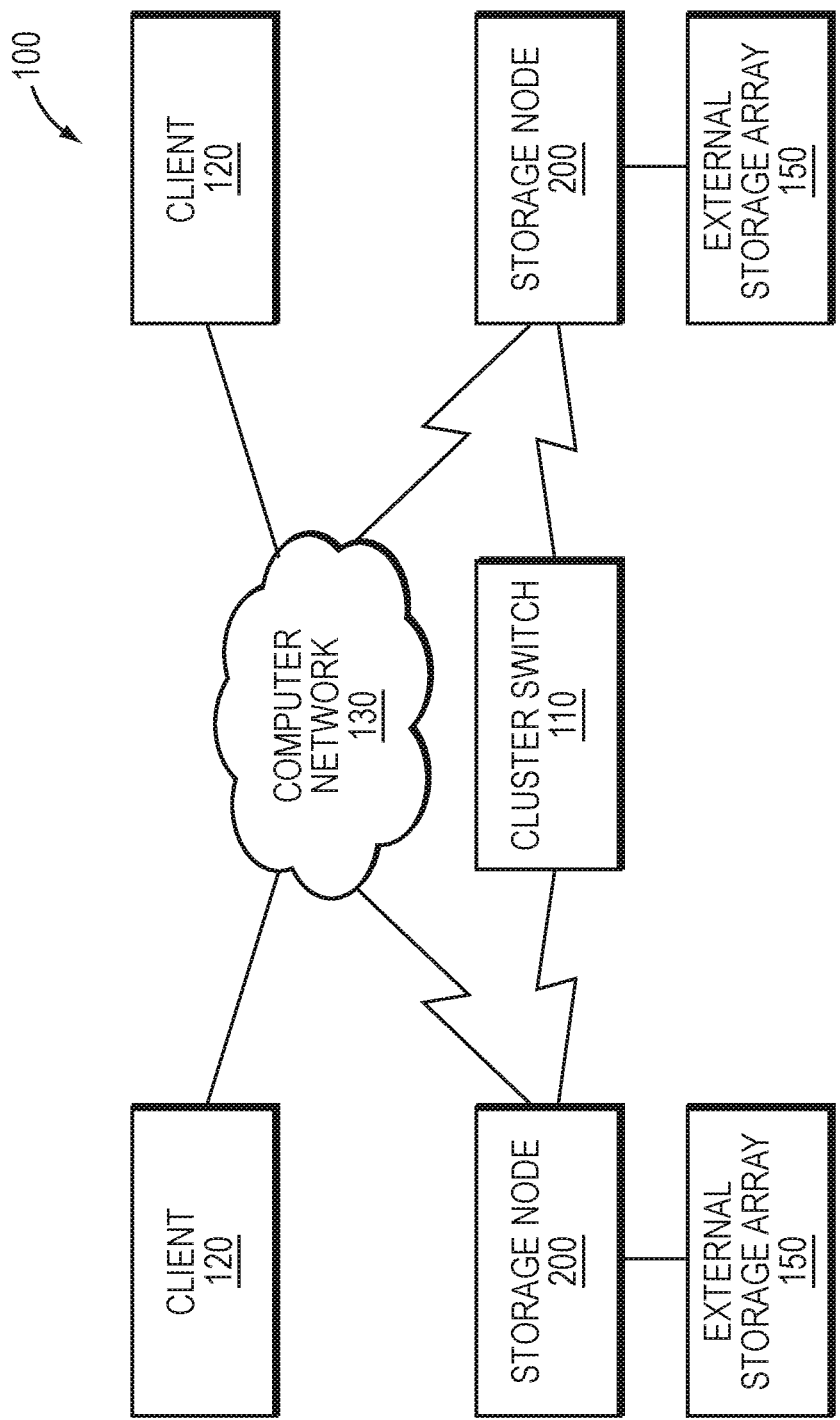
FIG. 1 is a block diagram of a plurality of storage nodes interconnected as a storage cluster.

The embodiments described herein are directed to a technique configured to improve storage utilization for various data protection schemes, such as replication and erasure coding, of data blocks of logical volumes ("volumes") served by storage nodes of a cluster configured to perform deduplication of the data blocks. Additionally, the technique is configured to ensure that each deduplicated data block complies with data integrity guarantees of the data protection schemes, while reducing storage space of the storage nodes. That is, for a plurality of data protection schemes applied to a data block, storage of redundant information necessary to provide the data integrity guarantee may be reduced while maintaining the same data integrity guarantee.

Each volume may be implemented as a set of data structures, such as data blocks that store data for the volume and metadata blocks that describe the data of the volume. The volume may be divided into the data blocks. A storage service implemented in each node includes a metadata layer having one or more metadata (slice) services configured to process and store the metadata, and a block server layer having one or more block services configured to process (deduplicate) and store the data on storage devices of the node. Notably, the block services are configured to provide maximum degrees of data protection as offered by the various data protection schemes and still deduplicate the data blocks across the volumes despite the various data protection schemes among the volumes.

When providing data protection in the form of replication (redundancy), a slice service of the storage node initially generates one or more copies of a data block for storage on the cluster. According to the technique, the volumes are assigned to the slice services depending upon the data protection scheme. For example, when providing triple replication protection of data, the slice service generates three copies of the data block (i.e., an original copy 0, a copy 1 and a copy 2) by synchronously copying (replicating) the data block to persistent storage of additional slice services of storage nodes in the cluster. The copies of the data block are then essentially represented as replicas (i.e., an original replica 0, a replica 1 and a replica 2) of the cluster by asynchronously flushing the data block copies to respective block services. Accordingly, a block of a volume may be assigned to an original replica 0 (R0) block service, as well as to a primary replica 1 (R1) block service and a secondary replica 2 (R2) block service. Each replicated data block is illustratively organized within an allotted bin that is maintained by the block services of each of the nodes for storage on the storage devices. Each bin is assigned to one or more block services based on the maximum replication scheme; illustratively, for a triple replication data protection scheme, three block services are assigned to each bin. The slice service computes a bin number and consults a bin assignment table to identify the storage nodes having corresponding block services to which the data block is written.

According to the technique, the data block is also associated (tagged) with an indication of its corresponding protection scheme. For instance, data blocks of a volume with double replication data protection (i.e., data blocks with one replica each) may have data blocks assigned to two block services because the R0 data block is assigned to a R0 block service and the R1 data block is assigned to the same bin but a different block service, i.e., primary R1 block service. Illustratively, a data block may belong to a first volume with double replication data protection and a different second volume with triple replication data protection. The technique ensures that there are sufficient replicas of the data block to satisfy the volume with the higher (highest) data integrity guarantee (i.e., highest data protection scheme). Illustratively, the slice services of the nodes may then issue store requests based on the replication scheme to asynchronously flush the copies (e.g., copies R0, R1 for double replication or copies R0-R2 for triple replication) of the data block to the block services associated with the identified storage nodes.

When providing data protection in the form of erasure coding, the block services may select data blocks to be erasure coded. A set of data blocks may then be grouped together to form a write group for erasure coding. Illustratively, write group membership is guided by varying bin groups so that the data is resilient against failure, e.g., assignment based on varying a subset of bits in a bin identifier. The slice services route data blocks of different bins and replicas to their associated block services. The implementation varies with an EC scheme selected for deployment (e.g., 4 data blocks and 2 encoded blocks for correction, referred to as 4+2 EC). The block services assign the data blocks to bins according to a cryptographic hash and group a number of the different bins together based on the EC scheme deployed, e.g., 4 bins may be grouped together in a 4+2 EC scheme (i.e., 4 unencoded data blocks+2 encoded blocks with correction information) and 8 bins may be grouped together in an 8+1 EC scheme. The write group of blocks from the different bins may be selected from data blocks temporarily spooled according to the bin. That is, the data blocks of the different bins of the write group are selected (i.e., picked) according to bin from the pool of temporarily spooled blocks by bin so as to represent a wide selection of bins with differing failure domains resilient to data loss. Note that only the data blocks (i.e., unencoded blocks) need to be assigned to a bin, while the encoded blocks may be simply associated with the write group by reference to the data blocks of the write group.

In an example, consider a block having a first data protection scheme using dual replication and a second data protection scheme using 4+1 erasure coding so that each scheme has a single redundancy against unavailability of any one block. Blocks may be grouped in sets of 4 and the erasure coding scheme may be applied to form an encoded block (e.g., a parity block), yielding 5 blocks for every set of 4 blocks instead of 4 blocks and 4 duplicates (i.e., 8 total blocks) for the replication scheme. Notably, the technique permits a protection scheme (e.g., 4+1 EC or double replication) to be selected on a block-by-block basis based on a set of capable protection schemes satisfying a same level of redundancy for the block according to a policy. For example, a performance-oriented policy may select a double replication scheme in which an unencoded copy of a block is always available without a need for parity computation. On the other hand, a storage space-oriented policy may select an EC scheme to eliminate replicas, so as to use storage more efficiently. Illustratively, the 4 duplicates from the above double replication scheme and 5 blocks from the 4+1 EC scheme (9 blocks total) may be consumed to store the 4 data blocks. As such, to maintain a single failure redundancy, 4 of the duplicate blocks may be eliminated, thereby reducing storage space of the storage nodes while maintaining the same data integrity guarantee against a single failure.

In order to satisfy the data integrity guarantees while improving available storage space, the storage nodes may perform periodic garbage collection for data blocks to optimize storage in accordance with currently applicable data protection schemes. Slice services of the storage nodes manage the metadata for each volume in slice files and, at garbage collection time, generate lists or Bloom filters for each data protection scheme. The Bloom filters identify data blocks currently associated with the data protection schemes and the block services use the Bloom filters to determine whether the data protection schemes for any data blocks that they manage may have changed. If the applicable data protection scheme(s) (i.e., the set of capable protection schemes) for a data block has changed, the block service may improve (e.g., reduce redundant information) storage consumption of the data block in accordance with the policy (e.g., better performance, better storage space efficiency) and the currently applicable schemes so as to maintain a level of data integrity associated with the changed (i.e., current) block. That is, a same level of redundancy of data associated with the current block may be maintained as redundancy schemes are changed.

For example, a data block may be tagged with a double replication scheme and a triple replication scheme. As such, an original and two copies of the data block (i.e., replica 0, replica 1, and replica 2) are stored to comply with both the double and triple protection schemes. If the triple replication scheme is no longer applicable to the data block (e.g., triple replication tag is eliminated), the third copy (i.e., replica 2) of the data block may be removed, leaving only the replicas 0 and 1 stored to comply with the remaining double replication scheme associated with the data block. If the data protection scheme associated with the data block is further altered to an erasure coding scheme and a policy of storage space efficiency is chosen, the data block may be included in a write group with single parity protection and the second copy (i.e., replica 1) of the data block may be removed such that the data block has a same level of redundancy as double replication scheme. However, if a performance policy is chosen, replica 1 may not be eliminated. Notably, a change of data protection scheme is selected from the set of capable protection schemes available for the block.

Other redundant information savings may occur even when the level of redundancy for the erasure code is greater than for replication when applying the policy of storage space efficiency. For example, consider the above set of 4 blocks using double replication (8 blocks total with 4 redundant blocks) to protect against any single random failure. The same 4 blocks may employ a 4+2 EC scheme (6 blocks total with 2 parity blocks) to protect against any two random failures. Although the data integrity guarantee may increase (i.e., 2 blocks may fail), 2 fewer blocks may be needed. Illustratively, 10 blocks are initially stored: 4 original data blocks, 4 replicas by the replication scheme and 2 parity blocks by the EC scheme. Thereafter 4 of the replicas may be eliminated leaving the 6 blocks used by the EC scheme (i.e., 4 data blocks and 2 parity blocks) with a higher level of data integrity than that used by the replication scheme alone. The savings may be even more pronounced for larger erasure coding schemes, such as 8+3 EC based on a Reed-Solomon code: the double replication scheme needs 16 blocks (8 data blocks+8 redundant blocks) whereas the 8+3 EC (8 data blocks+3 parity blocks) scheme employs only 11 blocks. Thus, 7 fewer blocks are needed to support 3 random failures where only one random failure was possible before.

Description

Storage Cluster

FIG. 1 is a block diagram of a plurality of storage nodes 200 interconnected as a storage cluster 100 and configured to provide storage service for information, i.e., data and metadata, organized and stored on storage devices of the cluster. The storage nodes 200 may be interconnected by a cluster switch 110 and include functional components that cooperate to provide a distributed, scale-out storage architecture of the cluster 100. The components of each storage node 200 include hardware and software functionality that enable the node to connect to and service one or more clients 120 over a computer network 130, as well as to a storage array 150 of storage devices, to thereby render the storage service in accordance with the distributed storage architecture.

Each client 120 may be embodied as a general-purpose computer configured to interact with the storage node 200 in accordance with a client/server model of information delivery. That is, the client 120 may request the services of the node 200, and the node may return the results of the services requested by the client, by exchanging packets over the network 130. The client may issue packets including file-based access protocols, such as the Network File System (NFS) and Common Internet File System (CIFS) protocols over the Transmission Control Protocol/Internet Protocol (TCP/IP), when accessing information on the storage node in the form of storage objects, such as files and directories. However, in an embodiment, the client 120 illustratively issues packets including block-based access protocols, such as the Small Computer Systems Interface (SCSI) protocol encapsulated over TCP (iSCSI) and SCSI encapsulated over FC (FCP), when accessing information in the form of storage objects such as logical units (LUNs).

Figure 2:
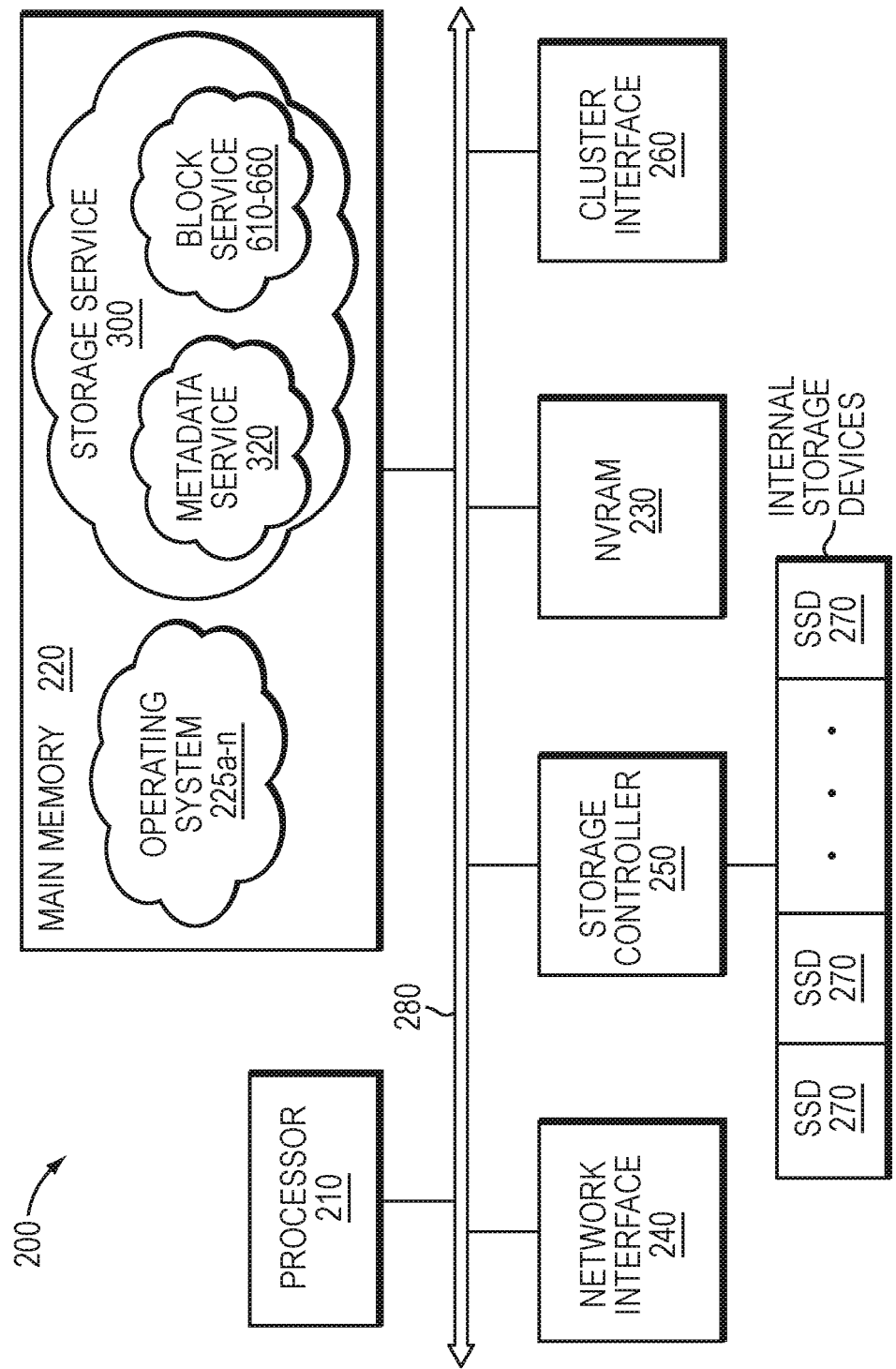
FIG. 2 is a block diagram of a storage node.

FIG. 2 is a block diagram of storage node 200 illustratively embodied as a computer system having one or more processing units (processors) 210, a main memory 220, a non-volatile random access memory (NVRAM) 230, a network interface 240, one or more storage controllers 250 and a cluster interface 260 interconnected by a system bus 280. The network interface 240 may include one or more ports adapted to couple the storage node 200 to the client(s) 120 over computer network 130, which may include point-to-point links, wide area networks, virtual private networks implemented over a public network (Internet) or a shared local area network. The network interface 240 thus includes the mechanical, electrical and signaling circuitry needed to connect the storage node to the network 130, which may embody an Ethernet or Fibre Channel (FC) network.

The main memory 220 may include memory locations that are addressable by the processor 210 for storing software programs and data structures associated with the embodiments described herein. The processor 210 may, in turn, include processing elements and/or logic circuitry configured to execute the software programs, such as one or more metadata services 320a-n and block services 610-660 of storage service 300, and manipulate the data structures. An operating system 225, portions of which are typically resident in memory 220 (in-core) and executed by the processing elements (e.g., processor 210), functionally organizes the storage node by, inter alia, invoking operations in support of the storage service 300 implemented by the node. A suitable operating system 225 may include a general-purpose operating system, such as the UNIX® series or Microsoft Windows® series of operating systems, or an operating system with configurable functionality such as microkernels and embedded kernels. However, in an embodiment described herein, the operating system is illustratively the Linux® operating system. It will be apparent to those skilled in the art that other processing and memory means, including various computer readable media, may be used to store and execute program instructions pertaining to the embodiments herein.

The storage controller 250 cooperates with the storage service 300 implemented on the storage node 200 to access information requested by the client 120. The information is preferably stored on storage devices such as internal solid state drives (SSDs) 270, illustratively embodied as flash storage devices, as well as SSDs of the external storage array 150 (i.e., an additional storage array attached to the node). In an embodiment, the flash storage devices may be block-oriented devices (i.e., drives accessed as blocks) based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. The storage controller 250 may include one or more ports having I/O interface circuitry that couples to the SSDs 270 over an I/O interconnect arrangement, such as a conventional serial attached SCSI (SAS) and serial ATA (SATA) topology.

The cluster interface 260 may include one or more ports adapted to couple the storage node 200 to the other node(s) of the cluster 100. In an embodiment, dual 10 Gbps Ethernet ports may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the storage node and cluster environment.

Storage Service

Figure 3A:
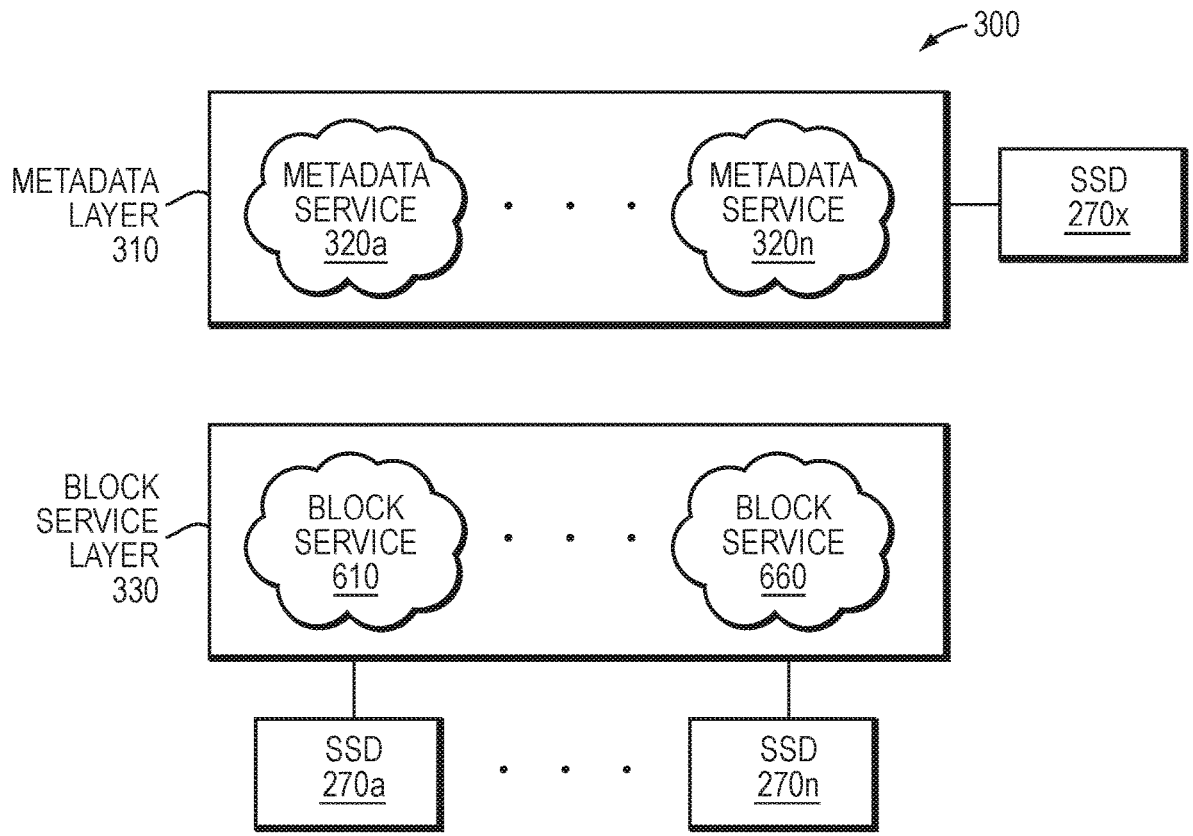
FIG. 3A is a block diagram of a storage service of the storage node.

FIG. 3A is a block diagram of the storage service 300 implemented by each storage node 200 of the storage cluster 100. The storage service 300 is illustratively organized as one or more software modules or layers that cooperate with other functional components of the nodes 200 to provide the distributed storage architecture of the cluster 100. In an embodiment, the distributed storage architecture aggregates and virtualizes the components (e.g., network, memory, and compute resources) to present an abstraction of a single storage system having a large pool of storage, i.e., all storage, including internal SSDs 270 and external storage arrays 150 of the nodes 200 for the entire cluster 100. In other words, the architecture consolidates storage throughout the cluster to enable storage of the LUNs, each of which may be apportioned into one or more logical volumes ("volumes") having a logical block size of either 4096 bytes (4 KB) or 512 bytes. Each volume may be further configured with properties such as size (storage capacity) and performance settings (quality of service), as well as access control, and may be thereafter accessible (i.e., exported) as a block storage pool to the clients, preferably via iSCSI and/or FCP. Both storage capacity and performance may then be subsequently "scaled out" by growing (adding) network, memory and compute resources of the nodes 200 to the cluster 100.

Each client 120 may issue packets as input/output (I/O) requests, i.e., storage requests, to access data of a volume served by a storage node 200, wherein a storage request may include data for storage on the volume (i.e., a write request) or data for retrieval from the volume (i.e., a read request), as well as client addressing in the form of a logical block address (LBA) or index into the volume based on the logical block size of the volume and a length. The client addressing may be embodied as metadata, which is separated from data within the distributed storage architecture, such that each node in the cluster may store the metadata and data on different storage devices (e.g., data on SSDs 270a-n and metadata on SSD 270x) of the storage devices coupled to the node. To that end, the storage service 300 implemented in each node 200 includes a metadata layer 310 having one or more metadata services 320a-n configured to process and store the metadata, e.g., on SSD 270x, and a block server layer 330 having one or more block services 610-660 configured to process and store the data, e.g., on the SSDs 270a-n. For example, the metadata services 320a-n map between client addressing (e.g., LBA indexes) used by the clients to access the data on a volume and block addressing (e.g., block identifiers) used by the block services 610-660 to store and/or retrieve the data on the volume, e.g., of the SSDs.

Figure 3B:
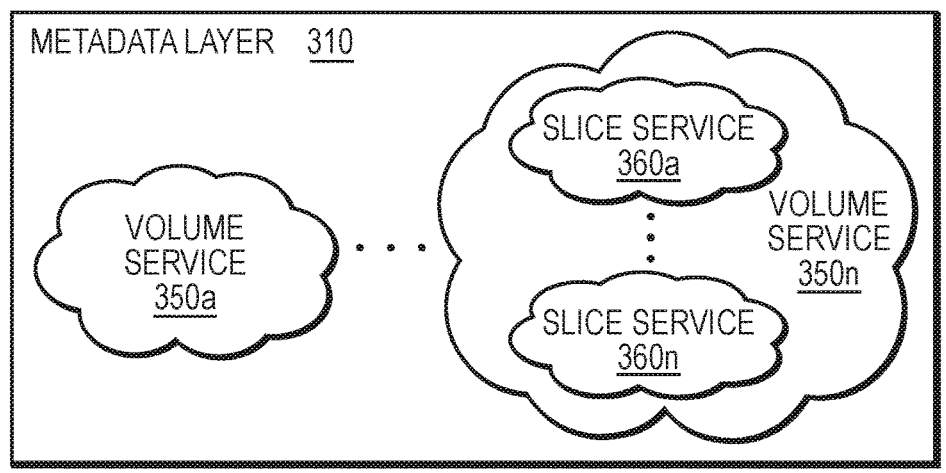
FIG. 3B is a block diagram of an exemplary embodiment of the storage service.

FIG. 3B is a block diagram of an alternative embodiment of the storage service 300. When issuing storage requests to the storage nodes, clients 120 typically connect to volumes (e.g., via indexes or LBAs) exported by the nodes. To provide an efficient implementation, the metadata layer 310 may be alternatively organized as one or more volume services 350a-n, wherein each volume service 350 may perform the functions of a metadata service 320 but at the granularity of a volume, i.e., process and store the metadata for the volume. However, the metadata for the volume may be too large for a single volume service 350 to process and store; accordingly, multiple slice services 360a-n may be associated with each volume service 350. The metadata for the volume may thus be divided into slices and a slice of metadata may be stored and processed on each slice service 360. In response to a storage request for a volume, a volume service 350 determines which slice service 360a-n contains the metadata for that volume and forwards the request the appropriate service 360.

Figure 4:
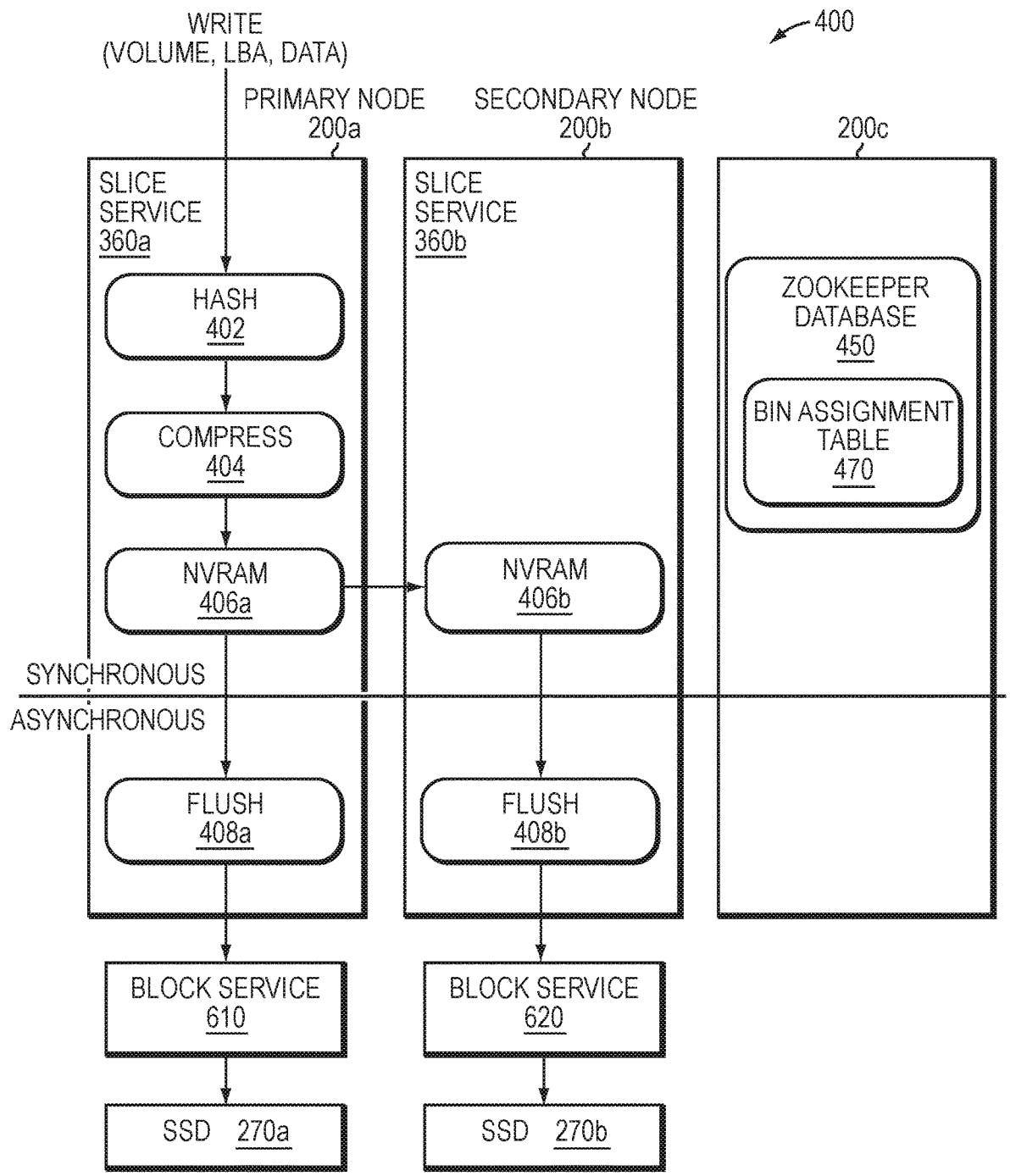
FIG. 4 illustrates a write path of the storage node.

FIG. 4 illustrates a write path 400 of a storage node 200 for storing data on a volume of a storage array 150. In an embodiment, an exemplary write request issued by a client 120 and received at a storage node 200 (e.g., primary node 200a) of the cluster 100 may have the following form:

write(volume,LBA,data)

wherein the volume specifies the logical volume to be written, the LBA is the logical block address to be written, and the data is logical block size of the data to be written. Illustratively, the data received by a slice service 360a of the storage node 200a is divided into 4 KB block sizes. At box 402, each 4 KB data block is hashed using a conventional cryptographic hash function to generate a 128-bit (16 B) hash value (recorded as a block identifier (ID) of the data block); illustratively, the block ID is used to address (locate) the data on the internal SSDs 270 as well as the external storage array 150. A block ID is thus an identifier of a data block that is generated based on the content of the data block. The conventional cryptographic hash function, e.g., Skein algorithm, provides a satisfactory random distribution of bits within the 16B hash value/block ID employed by the technique. At box 404, the data block is compressed using a conventional, e.g., LZW (Lempel-Zif-Welch), compression algorithm and, at box 406a, the compressed data block is stored in NVRAM 230. Note that, in an embodiment, the NVRAM 230 is embodied as a write cache. Each compressed data block is then synchronously replicated to the NVRAM 230 of one or more additional storage nodes (e.g., secondary storage node 200b) in the cluster 100 for data protection (box 406b). An acknowledgement is returned to the client when the data block has been safely and persistently stored in the NVRAM 230a,b of the multiple storage nodes 200a,b of the cluster 100.

Figure 5:
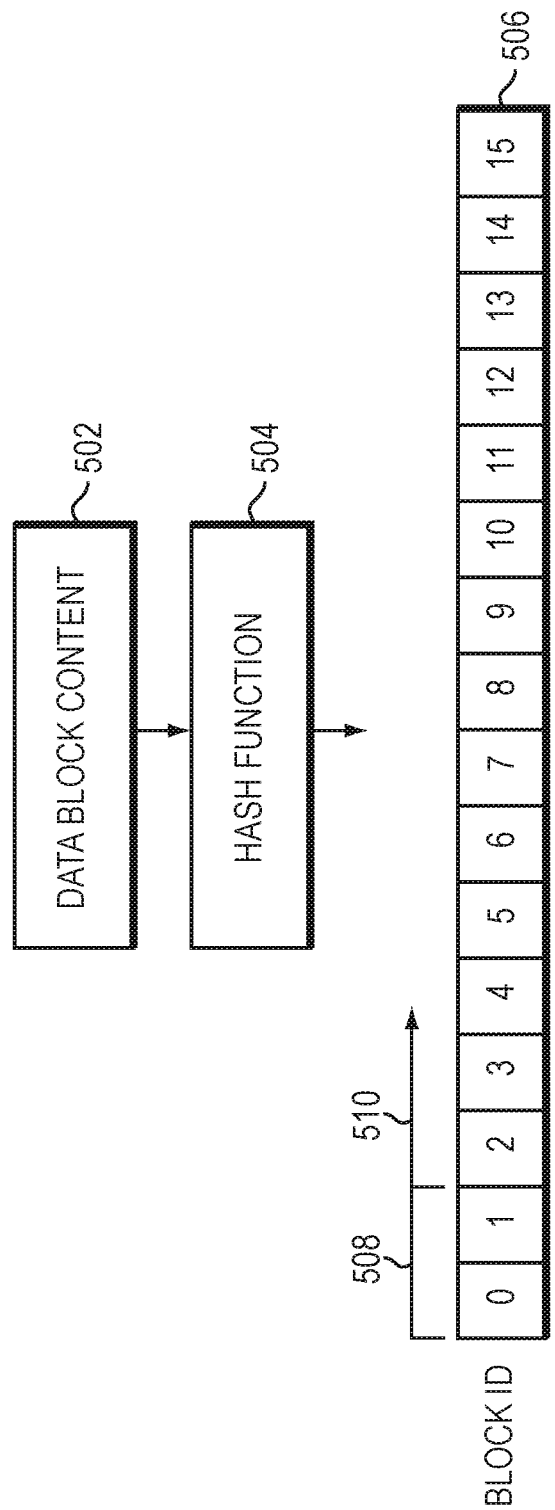
FIG. 5 is a block diagram illustrating details of a block identifier.

FIG. 5 is a block diagram illustrating details of a block identifier. In an embodiment, content 502 for a data block is received by storage service 300. As described above, the received data is divided into data blocks having content 502 that may be processed using hash function 504 to determine block identifiers (IDs) 506. That is, the data is divided into 4 KB data blocks, and each data block is hashed to generate a 16 B hash value recorded as a block ID 506 of the data block; illustratively, the block ID 506 is used to locate the data on one or more storage devices 270 of the storage array 150. The data is illustratively organized within bins that are maintained by a block service 610-660 for storage on the storage devices. A bin may be derived from the block ID for storage of a corresponding data block by extracting a predefined number of bits from the block ID 506.

In an embodiment, the bin may be divided into buckets or "sublists" by extending the predefined number of bits extracted from the block ID. For example, a bin field 508 of the block ID may contain the first two (e.g., most significant) bytes (2 B) of the block ID 506 used to generate a bin number (identifier) between 0 and 65,535 (depending on the number of 16 bits used) that identifies a bin. The bin identifier may also be used to identify a particular block service 610-660 and associated SSD 270. A sublist field 510 may then contain the next byte (1 B) of the block ID used to generate a sublist identifier between 0 and 255 (depending on the number of 8 bits used) that identifies a sublist with the bin. Dividing the bin into sublists facilitates, inter alia, network transfer (or syncing) of data among block services in the event of a failure or crash of a storage node. The number of bits used for the sublist identifier may be set to an initial value, and then adjusted later as desired. Each block service 610-660 maintains a mapping between the block ID and a location of the data block on its associated storage device/SSD, i.e., block service drive (BSD).

Illustratively, the block ID (hash value) may be used to distribute the data blocks among bins in an evenly balanced (distributed) arrangement according to capacity of the SSDs, wherein the balanced arrangement is based on "coupling" between the SSDs, i.e., each node/SSD shares approximately the same number of bins with any other node/SSD that is not in a same failure domain, i.e., protection domain, of the cluster. This is advantageous for rebuilding data in the event of a failure (i.e., rebuilds) so that all SSDs perform approximately the same amount of work (e.g., reading/writing data) to enable fast and efficient rebuild by distributing the work equally among all the SSDs of the storage nodes of the cluster. In an embodiment, each block service maintains a mapping of block ID to data block location on storage devices (e.g., internal SSDs 270 and external storage array 150) coupled to the node.

Illustratively, bin assignments may be stored in a distributed key-value store across the cluster. Referring again to FIG. 4, the distributed key-value storage may be embodied as, e.g., a "zookeeper" database 450 configured to provide a distributed, shared-nothing (i.e., no single point of contention and failure) database used to store bin assignments (e.g., a bin assignment table) and configuration information that is consistent across all nodes of the cluster. In an embodiment, one or more nodes 200c has a service/process associated with the zookeeper database 450 that is configured to maintain the bin assignments (i.e., mappings) in connection with a data structure, e.g., bin assignment table 470. Illustratively the distributed zookeeper is resident on up to, e.g., five (5) selected nodes in the cluster, wherein all other nodes connect to one of the selected nodes to obtain the bin assignment information. Thus, these selected "zookeeper" nodes have replicated zookeeper database images distributed among different failure domains of nodes in the cluster so that there is no single point of failure of the zookeeper database. In other words, other nodes issue zookeeper requests to their nearest zookeeper database image (zookeeper node) to obtain current bin assignments, which may then be cached at the nodes to improve access times.

For each data block received and stored in NVRAM 230a,b, the slice services 360a,b compute a corresponding bin number and consult the bin assignment table 470 to identify the SSDs 270a,b to which the data block is written. At boxes 408a,b, the slice services 360a,b of the storage nodes 200a,b then issue store requests to asynchronously flush copies of the compressed data block to the block services (illustratively labelled 610,620) associated with the identified SSDs. An exemplary store request issued by each slice service 360a,b and received at each block service 610,620 may have the following form:

store(block ID,compressed data)

The block service 610,620 for each SSD 270a,b (or storage devices of external storage array 150) determines if it has previously stored a copy of the data block. If not, the block service 610,620 stores the compressed data block associated with the block ID on the SSD 270a,b. Note that the block storage pool of aggregated SSDs is organized by content of the block ID (rather than when data was written or from where it originated) thereby providing a "content addressable" distributed storage architecture of the cluster. Such a content-addressable architecture facilitates deduplication of data "automatically" at the SSD level (i.e., for "free"), except for at least two copies of each data block stored on at least two SSDs of the cluster. In other words, the distributed storage architecture utilizes a single replication of data with inline deduplication of further copies of the data, i.e., there are at least two copies of data for redundancy purposes in the event of a hardware failure.

Improving Available Storage Space for Varying Protection Schemes

The embodiments described herein are directed to a technique for improving storage utilization for various data protection schemes, such as replication and erasure coding, for data blocks of the logical volumes served by storage nodes of a cluster configured to perform deduplication of the data blocks. Additionally, the technique is configured to ensure that each deduplicated data block complies with data integrity guarantees of the data protection schemes, while improving storage space of the storage nodes. That is, for a plurality of data protection schemes applied to a data block, storage of redundant information necessary to provide the data integrity guarantee may be reduced while maintaining the same data integrity guarantee.

As noted, the storage service implemented in each node includes a metadata layer having one or more metadata (slice) services configured to process and store the metadata, and a block server layer having one or more block services configured to process (deduplicate) and store the data on storage devices of the node. Notably, the block services are configured to provide maximum degrees of data protection offered by the various data protection schemes and still deduplicate the data blocks across the volumes despite the varying data protection schemes among the volumes.

When providing data protection in the form of replication (redundancy), a slice service of the storage node generates one or more copies of a data block for storage on the cluster. Illustratively, the slice service computes a corresponding bin number for the data block based on the cryptographic hash of the data block and consults (i.e., looks up) a bin assignment table to identify the storage nodes to which the data block is to be stored (i.e., written). In this manner, the bin assignment table tracks copies of the data block within the cluster. The slice services of the additional nodes then issue store requests to asynchronously flush copies of the data block to the block services associated with the identified storage nodes.

According to the technique, the volumes are assigned to the slice services depending upon the data protection scheme. For example, when providing triple replication protection of data, the slice service initially generates three copies of the data block (i.e., an original copy 0, a copy 1 and a copy 2) by synchronously copying (replicating) the data block to persistent storage (e.g., NVRAM) of additional slice services of storage nodes in the cluster. The copies of the data block are then essentially represented as replicas (i.e., an original replica 0, a replica 1 and a replica 2) of the cluster by asynchronously flushing the data block copies to respective block services. Accordingly, a block of a volume may be assigned to an original replica 0 (R0) block service, as well as to a primary replica 1 (R1) block service and a secondary replica 2 (R2) block service. Each replicated data block is illustratively organized within the allotted bin that is maintained by the block services of each of the nodes for storage on the storage devices. Each bin is assigned to one or more block services based on the maximum replication scheme; illustratively, for a triple replication data protection scheme, three block services are assigned to each bin. Illustratively, each slice service computes a corresponding bin number for the data block and consults (e.g., looks up using the bin number as an index) the bin assignment table 470 to identify the storage nodes to which the data block is written.

According to the technique, the data block is also associated (tagged) with an indication of its corresponding protection scheme. For instance, data blocks of a volume with double replication data protection (i.e., data blocks with one replica each) may have data blocks assigned to two block services because the R0 data block is assigned to a R0 block service and the R1 data block is assigned to the same bin but a different block service, i.e., primary R1 block service. Illustratively, a data block may belong to a first volume with double replication data protection and a different second volume with triple replication data protection. The technique ensures that there are sufficient replicas of the data block to satisfy the volume with the higher data integrity guarantee (i.e., highest data protection scheme). Illustratively, the slice services of the nodes may then issue store requests based on the protection scheme to asynchronously flush the copies (e.g., copies R0, R1 for double replication or copies R0-R2 for triple replication) of the data block to the block services associated with the identified storage nodes.

When providing data protection in the form of erasure coding, the block services may select data blocks to be erasure coded. When using erasure coding, the storage node uses an erasure code to algorithmically generate encoded blocks in addition to the data blocks. In general, an erasure code algorithm, such as Reed Solomon, uses n blocks of data to create an additional k blocks (n+k), where k is a number of encoded blocks of replication or "parity" used for data protection. Erasure coded data allows missing blocks to be reconstructed from any n blocks of the n+k blocks. For example, an 8+3 erasure coding scheme, i.e. n=8 and k=3, transforms eight blocks of data into eleven blocks of data/parity. In response to a read request, the data may then be reconstructed (if necessary) from any eight of the eleven blocks. Notably, a read is preferably performed from the eight unencoded data blocks and reconstruction used when one or more of the unencoded data blocks is unavailable.

A set of data blocks may then be grouped together to form a write group for erasure coding. Illustratively, write group membership is guided by varying bin groups so that the data is resilient against failure, e.g., assignment based on varying a subset of bits in the bin identifier. The slice services route data blocks of different bins (e.g., having different bin groups) and replicas to their associated block services. The implementation varies with an EC scheme selected for deployment (e.g., 4 data blocks and 2 encoded blocks for correction, 4+2 EC). The block services assign the data blocks to bins according to the cryptographic hash and group a number of the different bins together based on the EC scheme deployed, e.g., 4 bins may be grouped together in a 4+2 EC scheme and 8 bins may be grouped together in an 8+1 EC scheme. The write group of blocks from the different bins may be selected from data blocks temporarily spooled according to the bin. That is, the data blocks of the different bins of the write group are selected from the pool of temporarily spooled blocks by bin so as to represent a wide selection of bins with differing failure domains resilient to data loss. Note that only the data blocks (i.e., unencoded blocks) need to be assigned to a bin, while the encoded blocks may be simply associated with the write group by reference to the data blocks of the write group.

In an example, consider that a block has a first data protection scheme using dual replication and a second data protection scheme using 4+1 erasure coding so that each scheme has a single redundancy against unavailability of any one block. Blocks may be grouped in sets of 4 and the erasure coding scheme applied to form an encoded block (e.g., a parity block), yielding 5 blocks for every set of 4 blocks instead of 4 blocks and 4 duplicates (i.e., 8 total blocks) for the replication scheme. Notably, the technique permits a protection scheme (e.g., 4+1 EC or double replication) to be selected on a block-by-block basis based on a set of capable protection schemes satisfying a same level of redundancy for the block according to a policy. For example, a performance-oriented policy may select a double replication scheme in which an unencoded copy of a block is always available without a need for parity computation. On the other hand, a storage space-oriented policy may select an EC scheme to eliminate replicas, so as to use storage more efficiently. Illustratively, the 4 duplicates from the above double replication scheme and 5 blocks from the 4+1 EC scheme (9 blocks total) may be consumed to store the 4 data blocks. As such, to maintain a single failure redundancy, 4 of the duplicate blocks may be eliminated, thereby reducing storage space of the storage nodes while maintaining the same data integrity guarantee against a single failure. In an embodiment, the policy may be selected by an administrator upon creation of a volume.

Other redundant information savings may occur even when the level of redundancy for the erasure code is greater than for replication when applying the policy of storage space efficiency. For example, consider the above set of 4 blocks using double replication (8 blocks total with 4 redundant blocks) to protect against any single random failure. The same 4 blocks may employ a 4+2 EC scheme (6 blocks total with 2 parity blocks) to protect against any two random failures. Although the data integrity guarantee may increase (i.e., 2 blocks may fail), 2 fewer blocks may be needed. Illustratively, 10 blocks are initially stored: 4 original data blocks, 4 replicas by the replication scheme and 2 parity blocks by the EC scheme. Thereafter 4 of the replicas may be eliminated leaving the 6 blocks used by the EC scheme (i.e., 4 data blocks and 2 parity blocks) with a higher level of data integrity than that used by the replication scheme alone. The savings may be even more pronounced for larger erasure coding schemes, such as 8+3 EC based on a Reed-Solomon code: the double replication scheme needs 16 blocks (8 data blocks+8 redundant blocks) whereas the 8+3 EC (8 data blocks+3 parity blocks) scheme employs only 11 blocks. Thus, 7 fewer blocks are needed to support 3 random failures where only one random failure was possible before.

Illustratively, the bins are assigned to the bin group in a manner that optimizes the erasure coding process. For example, in the case of the triple replication data protection scheme, wherein three replica versions (original replica 0, primary replica 1, and secondary replica 2) of each bin are generated, the bins in a bin group are assigned such that original replica 0 versions of the bins are assigned across multiple different block services, the primary replica 1 versions of the bins are assigned to a different block service, and the secondary replica 2 versions are assigned to yet another different block service. Data blocks may be stored in the bins in accordance with the replication-based data protection scheme until a sufficient number of blocks are available for the selected erasure coding deployment. One of the different block services functioning as a master replica (master replicate block service) coordinates the erasure coding process and selects a data block which is a candidate for erasure coding from each of the bins. The master replica block service forms a write group with the data blocks, which remain unencoded, and generates one or more encoded parity blocks, e.g., primary and secondary encoded parity blocks. As is known to persons of skill in the art, a variety of erasure coding algorithms may be employed, such as Reed-Solomon. The encoded parity blocks may be stored with block identifiers for each of the data blocks used to generate the encoded blocks. Each replica block service updates its metadata mappings for the unencoded copies of the data blocks to point to (i.e., reference) the encoded data block (e.g., the primary and secondary encoded parity blocks) locations on storage devices so that any read requests for the data blocks can return the encoded blocks. Notably, the encoded block may be enumerated (i.e., primary, secondary, etc.) to support asymmetric erasure coding schemes. After storing and updating mappings for the encoded blocks, the master replica block service may free up the storage space occupied by the unencoded additional replicas of the data blocks in the write group while maintaining replica 0.

In order to satisfy the data integrity guarantees while increasing available storage space (i.e., reducing unnecessary storage of duplicate data blocks), the storage nodes perform periodic garbage collection for data blocks to increase storage in accordance with currently applicable data protection schemes. Slice services of the storage nodes manage the metadata for each volume in slice files and, at garbage collection time, generate lists or Bloom filters for each data protection scheme. The Bloom filters identify data blocks currently associated with the data protection schemes and the block services use the Bloom filters to determine whether the data protection schemes for any data blocks that they manage may have changed.

If the applicable data protection scheme(s) for a data block has changed, the block service optimizes (e.g., reduces redundant information) storage of the data block in accordance with the currently applicable schemes so as to maintain a level of data integrity previously associated with the changed block. That is, a same level of redundancy of data associated with the changed block is maintained when redundancy schemes are changed. For example, a data block may have been previously associated with both a double replication scheme and a triple replication scheme. To comply with the triple replication scheme, an original and two copies of the data block (i.e., replica 0, replica 1, and replica 2) have been stored. If the triple replication scheme is no longer applicable to the data block, the third copy of the data block may be removed, leaving only the replicas 0 and 1 stored to comply with the data integrity guarantee of the remaining double replication scheme.

Figure 6:
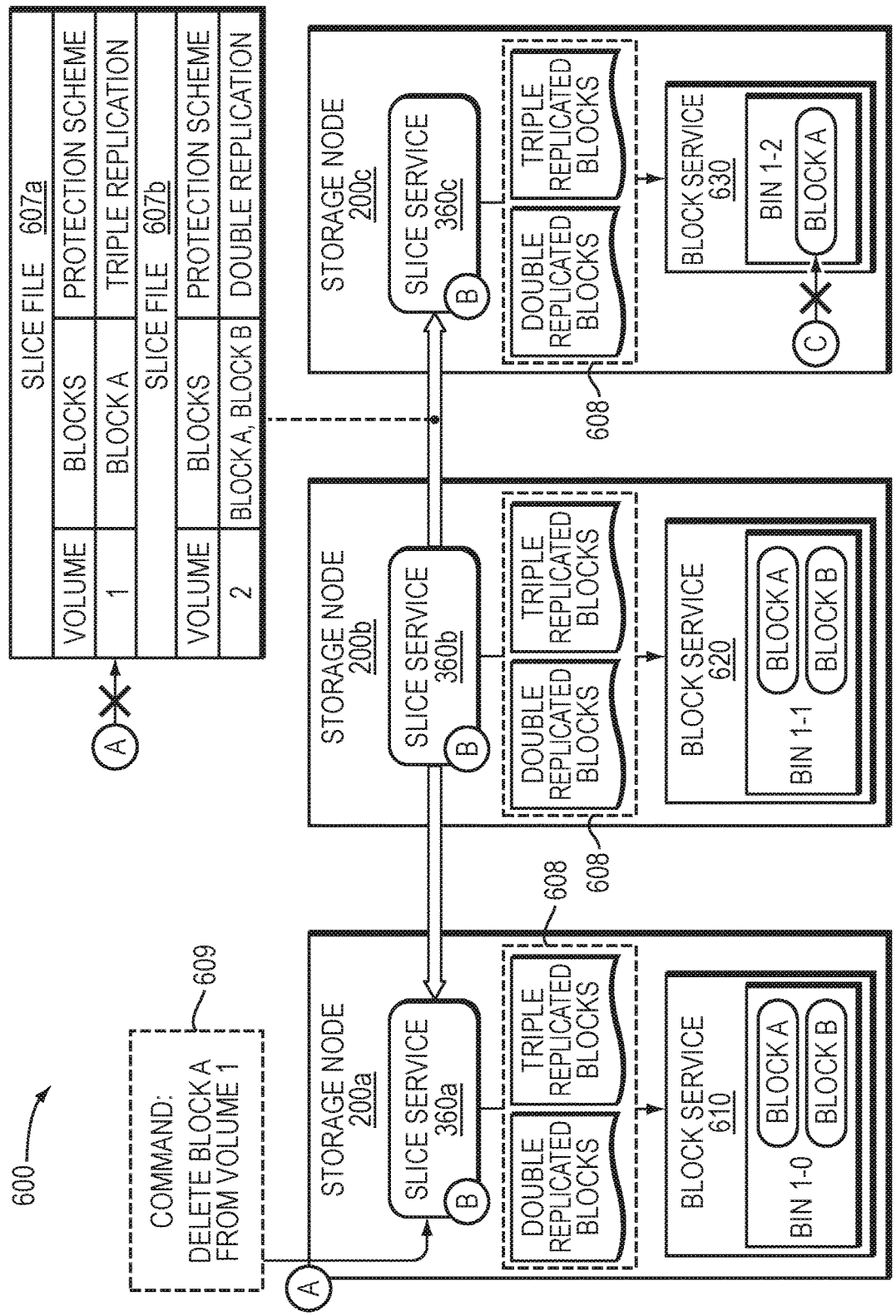
FIG. 6 illustrates an example workflow for a technique configured to provide multiple data protection schemes while maximizing available storage space.
Figure 7:
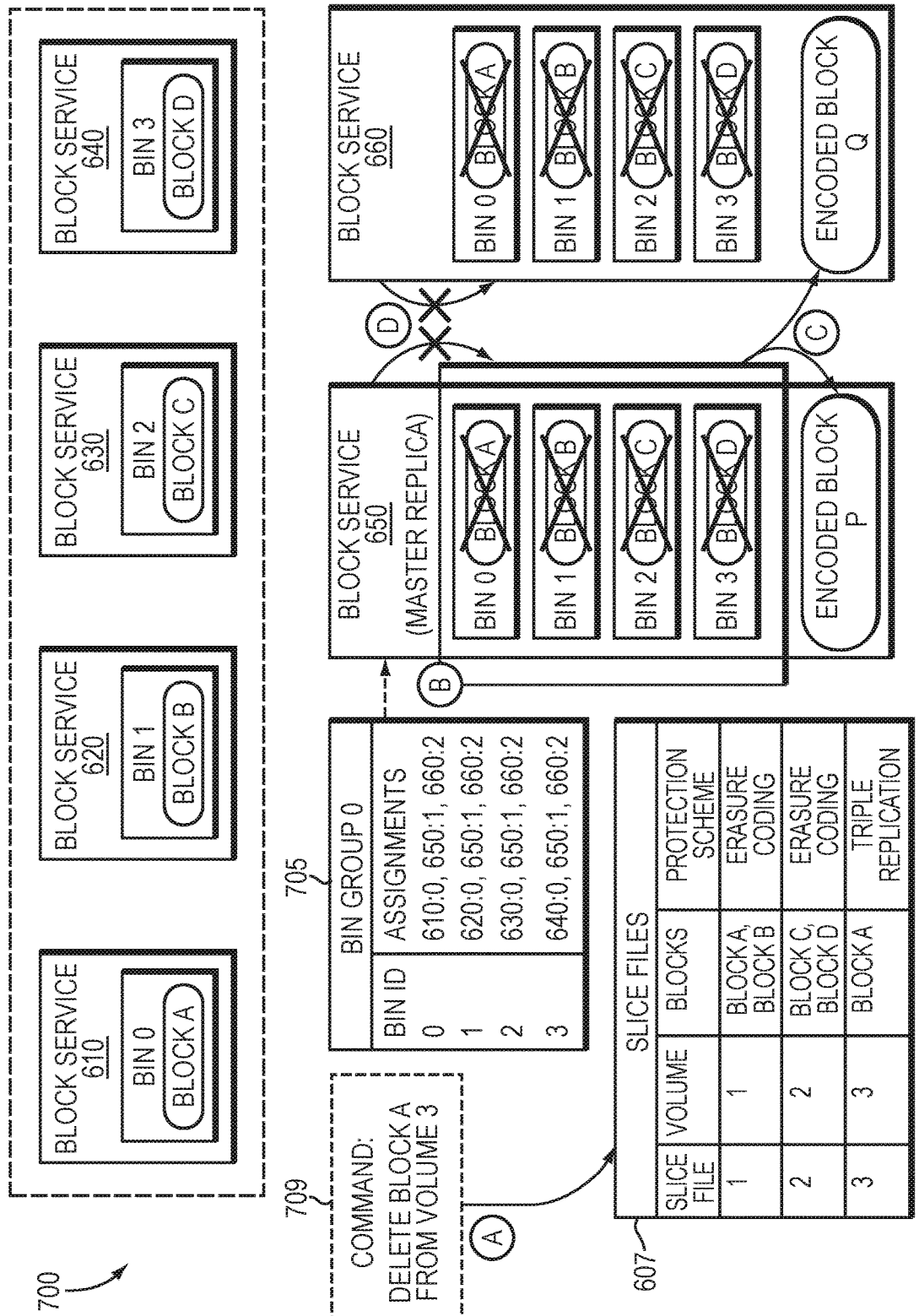
FIG. 7 illustrates an example workflow for the technique configured to provide multiple data protection schemes including erasure coding while maximizing available storage space.

FIGS. 6 and 7 illustrate example workflows for providing multiple data protection schemes while improving available storage space for a cluster. It should be noted that the workflows are annotated with a series of letters A-G that represent stages of operations. Although ordered for the workflow(s), the stages illustrate one example to aid in understanding the disclosure and should not be used to limit the claims. Subject matter falling within the scope of the claims can vary with respect to the order and some of the operations. Notably, as storage nodes are added to the cluster (i.e., the cluster is scaled out), data blocks and redundant information (e.g., parity blocks and replicas) may be rebalanced within the cluster as bins are reassigned within the scaled-out cluster.

Referring to the example workflow 600 of FIG. 6, each storage node 200*a*-*c* includes a slice service 360*a*-*c* and a block service 610-630, respectively. Each block service 610-630 hosts a bin 1-0, a bin 1-1, and a bin 1-2, respectively, wherein each bin is assigned to and managed by its corresponding block service. Prior to stage A, data blocks A and B are received from one or more of the clients 120 for storage at the storage nodes 200*a*-*c*. A write request from a client includes a data block and identifies a volume on which the data is to be stored. The slice service 360*a* of storage node 200*a* functions as a managing (original) slice service and handles requests from the client (i.e., client-facing slice service). The slice service 360*a* manages metadata in a slice file 607*a* and a slice file 607*b* (collectively referred to as the slice files 607) that are replicated across the storage nodes 200*b,c* to the slice services 360*b* and 360*c*. Illustratively, slice files have a one-to-one relationship (i.e., association) with volumes: the slice file 607*a* stores metadata for a volume 1 and the slice file 607*b* stores metadata for a volume 2. As requests are received for a specific volume, the slice service 360*a* updates the corresponding slice file accordingly. For example, block B is received with a write request directed to volume 2, so the slice service 360*a* updates the slice file 607*b* accordingly by indicating that block B is associated with volume 2. The slice service 360*a* also notifies slice services 360*b* and 360*c* of the update to the slice file and provides the metadata for the update.

In response to the write request for block B, the slice service 360*a* prepares block B for storage by corresponding block service 610. As previously indicated, data blocks are stored by bin assigned to each of the block services according to the bin assignment table 470. As noted, a data block may be assigned to a bin based on leading bits (i.e., of bin field 508) of the block ID 506 for the data block. Also as indicated previously, the block ID may be generated based on a cryptographic hash of the data block, and the data block is then stored in a bin corresponding to a bin identifier of the bin field 508. For example, assume block B has a block ID having a leading bit of "1" in bin field 508 and, thus, is assigned to the bin 1-0 which, in turn, is assigned to the block service 610. Note that as a result of deduplication, a single data block may be associated with multiple volumes. Illustratively, block A is associated with both volume 1 and volume 2 as indicated in the slice files 607 but is stored merely a single time in bin 1-0 so as to preserve storage space. In an embodiment blocks are stored with the block ID 506, so that a block service avoids storing duplicate copies of the block by determining that a block with the same hashed identifier has already been stored.

According to the technique, data blocks may have multiple applicable data protection schemes. The data protection schemes may include double replication (replication) and triple replication, as shown in FIG. 6, as well as erasure coding or other techniques, as shown in FIG. 7, for data durability. As indicated in the slice files 607, data protection schemes can be configured on a per volume basis, e.g., volume 1 is configured with a triple replication data protection scheme and volume 2 is configured with a double replication data protection scheme. A single data block belonging to multiple volumes, such as the block A, may have varying data protection schemes and, therefore, have varying data protection requirements. The technique described herein ensures that each data block is protected at the highest-level protection scheme (i.e., the greatest data integrity guarantee having a highest failure tolerance) configured by any one of the volumes which uses the data block. For example, a data block belonging to volume 2 configured with a double replication scheme and volume 1 configured with triple replication scheme is protected by the triple replication scheme which provides greater protection since it can tolerate two failures instead of just a single failure. As a result, block A is stored a total of three times as required by the triple replication scheme of volume 1, even though volume 2 which also includes block A only requires double replication. Illustratively, block B, however, is only stored twice in accordance with the double protection scheme of volume 2.

To support the data protection schemes, replicas of bins are generated and assigned across the block services of the cluster. In an embodiment, bins may contain data blocks from a number of volumes, wherein each bin is configured to support a highest-level data protection scheme available, even if the highest protection scheme is not utilized by any data blocks currently in the bin. That is, bins are assigned to blocks services globally (i.e., across the cluster) based on data protection capability, even if no volume or data is currently using the highest-level data protection. For example, in FIG. 6, the highest-level protection scheme is triple replication, so two replicas of each bin are created and assigned to block services in addition to a bin which hosts replica 0 copies of data blocks. Bin 1-0, which is illustratively maintained by block service 610, hosts the unencoded versions/replica 0 copies of the block A and block B. Bin 1-1, which is illustratively maintained by the block service 620, hosts replica 1 (R1) copies of data blocks as indicated by the "-1" of the "hosts replica" notation "bin 1-1." Similarly, bin 1-2, which is illustratively maintained by block service 630, hosts replica 2 (R2) copies of data blocks as indicated by the "-2" of the hosts replica notation "bin 1-2." Specifically, the bin 1-1 hosts R1 copies of the block A and block B, and bin 1-2 hosts a R2 copy of block A. Notably, a bin assignment service (not shown) may assign the bins (i.e., create and modify the bin assignment table 470) in a manner such that the bins are located across different failure domains such as, e.g., different SSD, different storage nodes and/or different chassis of nodes.

Illustratively, at stage A, the slice service 360a receives a command 609 indicating that block A should be deleted from volume 1. The slice service 360a updates the slice file 607a accordingly by removing a mapping between volume 1 and block A, as indicated by the X in FIG. 6. The updated slice file 607a (i.e., metadata update) is replicated across the appropriate slice services. The slice services may delay transmission of commands to the block services to delete the original or any copies of block A to avoid a performance impact of small random delete operations. Instead, input/output (I/O) performance of the block services (e.g., I/O performance of the SSDs 270) can be improved by saving delete operations for a planned garbage collection period so that writes to the SSDs can be ganged.

Illustratively, at stage B, the slice services begin performing garbage collection to remove unused data blocks. Garbage collection may be performed periodically, such as once every hour or once every day. Prior to initiation of the garbage collection process, the slice services may communicate using a consensus protocol that garbage collection should be performed. In an embodiment, a slice service may object to commencing garbage collection when a current I/O request load exceeds a load threshold or exceeds a space threshold of an amount of storage space that is still available (i.e., garbage collection is less necessary). Conversely, a slice service may request that garbage collection occur outside of the schedule periodic garbage collection time when an amount of available storage space falls below a minimum space threshold. In an embodiment, as part of the garbage collection process, the slice services examine (i.e., walk or stride) the slice files 607 to identify data blocks currently used by the volumes of the cluster and generate block listings 608. Illustratively, the block listings 608 include a list of blocks for each data protection scheme employed, e.g., a list for double replicated blocks and a list for triple replicated blocks. Alternatively, the block listings 608 may embody other data structures, such as Bloom filters or ranges of block IDs to indicate which blocks are in use so that unused blocks may be removed by garbage collection to improve storage efficiency. The block listings 608 may also include a master list of blocks in use, regardless of associated data protection schemes.

Illustratively, at stage A, block A is unmapped from volume 1, which is the only volume that requires triple replication for block A. As the slice services walk the slice files 607 during stage B, block A is thus not included in the list of triple replicated blocks and is only included in the list of double replicated blocks. After generating the block listings 608, the slice services may publish the block listings 608 to the block services. In an embodiment, publication by the slice services may be effected by transmitting a memory location for the block listings 608 to the block services or otherwise notifying and providing the block services with the block listings 608 for performing garbage collection.

At stage C, the block services continue the garbage collection process. Using the block listings 608, each block service compares block IDs of the data blocks stored in their assigned bins with the block listings 608 to determine whether the data blocks are still in use and, thus, subject to deletion. The block services check the lists based on a data protection scheme associated with a bin currently being analyzed. For example, block service 630 compares block IDs for data blocks stored in bin 1-2 with block IDs of the block listings 608 for triple replicated blocks, since bin 1-2 is a replica 2 of bin 1 and, thus, only contains triple replicated blocks. The block service 620 compares block IDs for bin 1-1 with both the double replicated and triple replicated lists in the block listings 608 to determine whether blocks as are still in use since the bin 1-1 may host blocks for both data protection schemes.

Alternatively, in some implementations, the slice services may generate the block listings 608 so that all triple replicated blocks are also listed in the listing for double replicated blocks, since triple replicated blocks are also inherently double replicated. In such implementations, the block service 620 may only check the list for double replicated blocks. Similarly, block service 610, which hosts a master (original) copy of the data blocks, may check both lists (i.e., the double and triple replicated block lists) in the block listings 608 or may check a master list of blocks (not depicted). If a block ID for a stored data block is not found in the appropriate lists of the block listings 608, the block service may delete or free up the storage space of the data block which is no longer in use.

Illustratively, as part of the garbage collection process at stage C, the block service 630 deletes block A from the replica 2 bin 1-2 since block A is no longer required to be triple replicated. In order to increase available storage space, the technique is configured to store data blocks in an efficient manner that still satisfies any applicable data protection scheme. As a result of the command 609 at stage A, block A is removed from volume 1 which requires a double replication protection scheme, but remains included in volume 2 which is configured with a triple replication scheme. Since a replica 2 copy of the block A is not required for compliance with a double replication scheme, block A is removed from bin 1-2 that provides for third replicas. Notably, replica 0 and replica 1 copies of block A remain stored for use by volume 2 as required by its double replication scheme. If block A is later deleted by a client request from volume 2, block A would no longer be in use by any volume and, thus is subject to removal from the cluster by block services 610 and 620 in a later garbage collection.

As noted, in some implementations, data blocks may be tagged with their applicable data protection schemes. In an embodiment, each data block may be associated with a data protection bit mask, wherein an unasserted sentinel value, e.g., "0", indicates that a corresponding data protection scheme does not apply and an asserted sentinel value, e.g., "1", indicates that the corresponding data protection scheme does apply. Illustratively, a first bit of the bit mask may correspond to double replication, a second bit to triple replication, a third bit to a 4+1 erasure coding scheme, and a fourth bit to a 4+2 erasure coding scheme. Accordingly, a data block associated with double and triple replication would have a mask of, e.g., "1100." Such data protection bit masks can be maintained by the block services for each data block stored in their assigned bins. For example, at stage C, after determining that the block A is no longer required to be triple replicated, block service 610 may update the bit mask associated with block A to reflect the change in protection schemes. Likewise, block service 620 may update the bit mask associated with the replica 1 copy of the block A.

In an embodiment, the slice services may replicate the slice files 607 across the storage nodes so that each slice service has information for all stored blocks and associated volume/data protection scheme mappings. Alternatively, the slice services may not replicate the slice files 607 or may only replicate the content/information in one or more of the slice files based on the data protection scheme of the corresponding volume. For example, the information in the slice file 607*b* related to volume 2 may not be replicated to slice service 360*c* since volume 2 is only double replicated. As an additional example, each of the slice services may only store and manage slice file information for assigned volumes, e.g. volume 1 may be assigned to slice service 360*a* and volume 2 may be assigned to slice service 360*b*. Here, each slice service may individually generate its own block listings 608 based on the slice file information available to it and communicate its unique block listings to all of the block services across the storage nodes of the cluster. Therefore, each block service may receive three versions of the double replicated block listing and the triple replicated block listings.

Referring to the example workflow 700 of FIG. 7, the block services 610-640 host bins 0-3, i.e., the bins are assigned to and managed by their corresponding block service. As used herein, a bin group identifies bins (bin IDs) from which data blocks are selected for erasure coding. The number of bins in a bin group corresponds to a number of input data blocks for an erasure coding scheme; for example, a 4+2 EC scheme (as described in the workflow 700) uses four bins. Thus, a bin group assignment 705 specifies four bin IDs: bin 0, bin 1, bin 2, and bin 3. Illustratively, the bin group assignment 705 also specifies that the primary (master) replica block service 650 and a secondary replica block service 660 store replicas for each of the bins. As indicated by the assignment notations "650:1" and "660:2," the master replica block service 650 stores (hosts) replica 1 for each bin in the bin group, and the secondary replica block service 660 hosts replica 2 for each bin in the bin group. The bin group assignment 705 may be generated by a master/manager of the cluster 100 ("cluster master/manager") or other service (e.g., a bin assignment service, not depicted) which handles bin assignments and maintained in a bin group assignment table (not shown) within the zookeeper database 450. Notably, the bin assignment service ensures that (i) each original replica 0 version of bins selected for a bin group is assigned to a different block service (e.g., bins 0-3 are assigned across block services 610-640), (ii) the primary replica 1 versions of the bins are assigned to a same block service (e.g., all of the replica 1's are assigned to the master replica block service 650) and (iii) the secondary replica 2 versions of the bins are assigned to a same block service (e.g., all of the replica 2's are assigned to the secondary replica block service 660).

Illustratively, the bin assignment service may also assign the bins in such a manner that the bins are located across different failure domains. For example, each bin may be assigned to or selected from a different solid state drive (SSD), a different storage node, and/or a different chassis of storage nodes. Moreover, the bin assignment service may ensure that no block service hosts multiple replicas for the same bin. The bin assignment service makes the bin group assignment 705 available to all block services including the primary and secondary replica block services 650 and 660 respectively. As noted, the block service 650 hosts a primary encoded replica and, thus, functions as the master replica block service 650 that uses the bin group assignment 605 to coordinate the erasure coding process, whereas the block service 660 hosts a secondary encoded replica and functions as the secondary replica block service 660.

Slice files 607 reflect the volume and data protection scheme information for data blocks A-D, which are assigned to an erasure coding data protection scheme as configured on volumes 1 and 2. Block A, however, is also configured to be protected by a triple replication scheme as indicated for volume 3. The technique described herein permits prioritizing protection schemes according to a policy, such as replication-based data protection schemes over erasure coding schemes. In other words, if a data block has an applicable replication-based protection scheme, the data block may not be erasure coded. Erasure coding may result in slower degraded reads when reconstructing information in the event of failure, i.e. reads in which the replica 0 copy of a data block is no longer available. In such instances, erasure coding requires rebuilding the missing data block, which is more time consuming (requires reading other data blocks as well as parity to perform reconstruction) than simply reading an unencoded copy of the missing data block. Accordingly, use of replication-based redundancy schemes presume that slower degraded reads of EC schemes resulting from reconstruction may be an unacceptable performance impact for data stored on that volume. As a result, because the block A is associated with a replication scheme, block A may not be used for erasure coding, and prior to stage A, there is an insufficient number of blocks to satisfy the 4+2 erasure coding scheme.

At stage A, in response to receiving a command 709 indicating that block A should be deleted from volume 3, a slice service 360 updates the slice file 3 of slice files 607 to indicate that data block A is no longer associated with volume 3. Block A is thus removed from volume 3 and, as a result, that data block is available for erasure coding. In an embodiment, erasure coding may be performed during a subsequent garbage collection or recycling period. Master replica block service 650, which coordinates the erasure coding process, compares its block identifiers with the data protection scheme-based block listings generated by the slice services. After updating block A to indicate that its only applicable data protection scheme is erasure coding, block service 650 determines that there is an available data block from each bin in the bin group for erasure coding and performs the erasure coding process at stages B, C, and D. Performing erasure coding when possible increases the available storage space as the unencoded copies (i.e., replicas) for the blocks A-D can be removed. Notably, while more than one replication scheme remains associated with a block, recovery of that block may be determined based on a policy as to which recovery scheme should be employed, e.g., erasure code recovery and replica recovery.

At stage B, master replica block service 650 identifies data blocks A-D as available for erasure coding and forms a write group with the blocks A-D. Block service 650 may analyze a data protection bit mask associated with each block that identifies the applicable data protection schemes to determine that the blocks may be erasure coded. At stage C, the block service 650 generates and writes an encoded block P within its own storage and generates and writes an encoded block Q to the secondary replica block service 660. The master replica block service 650 reads its unencoded copies of the data blocks A-D and processes them using an erasure coding algorithm to generate the encoded parity blocks P and Q. The master replica block service 650 updates the metadata entries, e.g., of respective map fragments, for the data blocks A, B, C, and D with a mapping that points to the encoded parity block P on the BSD of the block service 650 in addition to the existing location mappings for the data blocks. The secondary replica block service 660 similarly updates its mappings for the data blocks to include the location of the encoded parity block Q on the BSD of block service 660. The encoded parity blocks are also stored with block IDs of the data blocks in the write group, i.e., data blocks A-D which were used to generate the encoded parity blocks. At stage D, the master replica block service 650 deletes the unencoded copies of the data blocks A, B, C, and D from the block service 650, and the secondary replica block service 660 deletes the unencoded copies of the data blocks A, B, C, and D from the block service 660. Since the encoded blocks P and Q have been created, the data blocks A, B, C, and D are now protected by a 4+2 erasure coding scheme and can still be read (recovered) even after two failures. As a result, the unencoded copies of the data blocks may be deleted to free up storage space.

Figure 8:
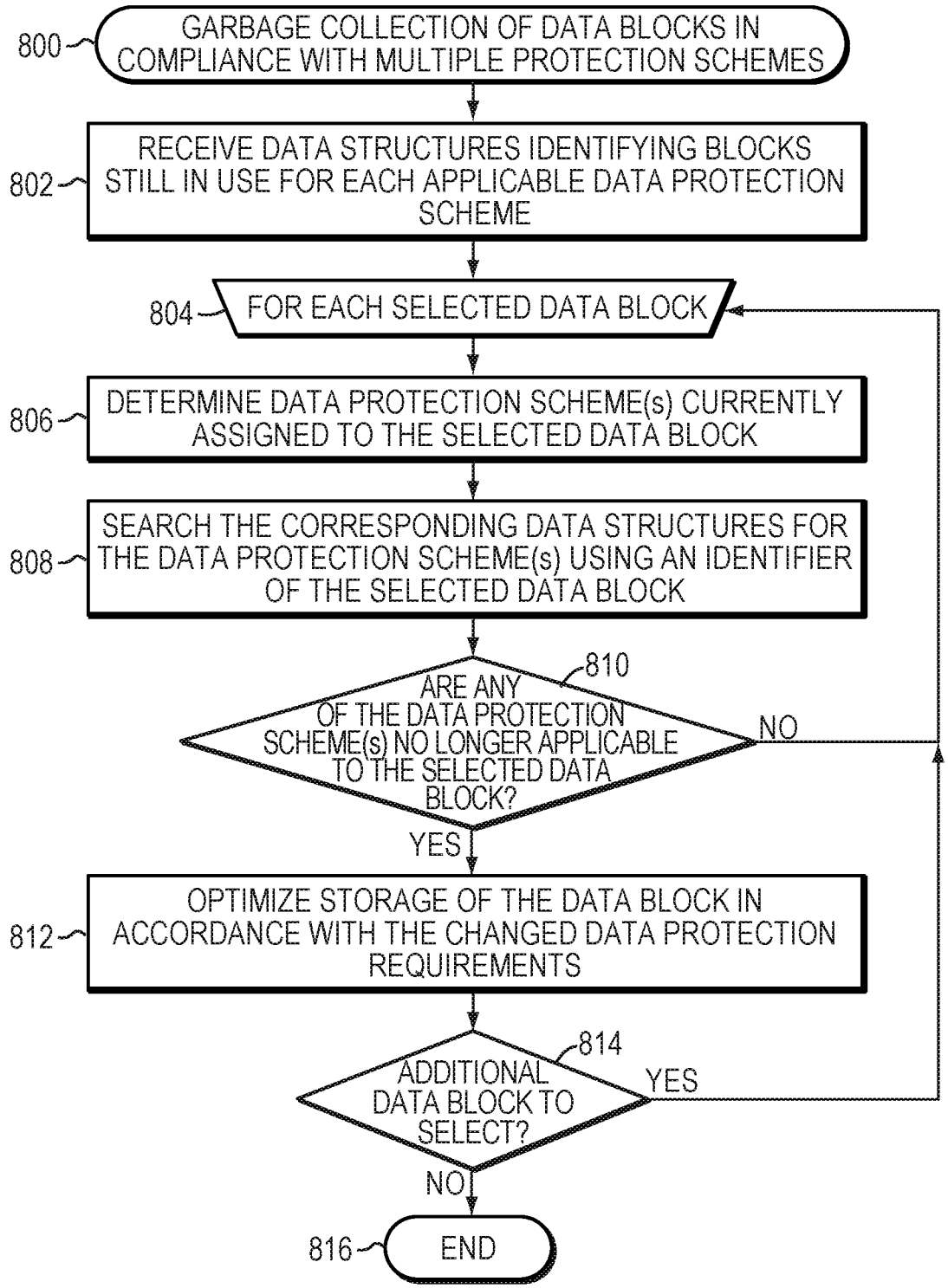
FIG. 8 is a flowchart illustrating operations of a method for garbage collection of data blocks in compliance with multiple data protection schemes.

FIG. 8 is a flowchart illustrating operations of a method for garbage collection of data blocks in compliance with multiple data protection schemes (block 800) in storage service 300. In an embodiment, the operations may be performed by a block service 610-660. Broadly stated, the block service may identify currently applicable data protection schemes for each data block stored in its one or more assigned bins. If it is determined that the applicable data protection schemes for a data block has changed, the block service may reduce storage overhead of the data block by deleting unnecessary copies or erasure coding the data block along with other data blocks to allow for freeing up (i.e., increasing) of storage space previously occupied by the unencoded copies of the data blocks.

At block 802, the block service receives data structures, such as Bloom filters, identifying data blocks still in use for each applicable data protection scheme and, for each selected data block (block 804), determines the data protection scheme(s) currently assigned to the selected block (block 806). At block 808, the block service searches the corresponding data structures for the data protections scheme(s) using an identifier (block ID) of the selected data block. At decision block 810, a determination is rendered as to whether any of the data protection scheme(s) are no longer applicable to the selected data block. If not, the method returns to block 804; otherwise, at block 812, storage of the selected data block is optimized (e.g., reduced) in accordance with the changed data protection requirements At decision block 814, a determination is rendered as to whether there are any additional data blocks to select and, if so, the method returns to block 804. Otherwise, the method ends at block 816.

The embodiments described above in FIGS. 6-8 illustrate some of the operations which can ensure maximization of available storage space without violating one or more applicable data protection schemes ("DPSs"). Other scenarios not contemplated above, e.g., a scenario where an erasure coded data block becomes associated with a replication based DPS, can be handled in accordance with one or more operating rules that ensure satisfaction of all applicable DPSs.

In general, garbage collection may be employed in a manner that does not violate the data integrity guarantee of any DPS. For example, if the same block is stored on double replication and triple replication volumes, at least three copies of that block are required to exist. That is, the data integrity guarantees a level of failure redundancy (e.g., no data loss in the event of k failures) for the DPS. The slice services may specify the DPS of the data for all read and write operations. Specification of the DPS may allow the block services to perform additional error checking. The technique described herein illustratively prioritizes storing unencoded copies of the data blocks over storing encoded parity copies of the block; such prioritization provides customers with improved degraded read performance for data stored on a volume with a replication-based DPS. In an embodiment, write groups are created for one DPS, which simplifies encoding, garbage collection and bin syncing, while reducing the DPS information needed for storage with an encoded block. Also, maximizing storage space or performing deduplication between write groups with different numbers of encoded copies increases write amplification during garbage collection.

When performing write requests, block services hosting unencoded copies of data blocks may write an unencoded copy if there is no existing unencoded copy of the block. Block services hosting encoded copies of blocks may write an unencoded copy if there is no existing encoded copy of the block that matches the specified DPS for the write request and there is no existing unencoded copy of the block. Block services hosting unencoded copies of data blocks may set a DPS bit of the (DPS) bit mask for the unencoded block if the bit mask for the unencoded block does not have an appropriate bit set. Similarly, block services hosting encoded parity copies of blocks may set the DPS bit for the unencoded block if the DPS bit mask for the unencoded block does not have the appropriate bit set and the encoded block does not exist.

In an embodiment, when performing erasure coding operations, the master replica block service may encode an unencoded data block when the replica count for a block according to the DPS is greater than a maximum replica count for all of the block's replication-based schemes. That is, if an excess number of replicas exists for the level of failure redundancy associated with the volume, then an excess number of unencoded data blocks may be redeployed as encoded (i.e., parity) blocks instead of marking them unused for eventual garbage collection.

Illustratively, various rules may apply for initiating the garbage collection process. A block service may start garbage collection when the block service has received final Bloom filters associated with a DPS from all slice services for all DPSs. A slice service may send final Bloom filters to the block service for unencoded copies of the block relating to an erasure coding based DPS if a change of DPS for a volume has completed for all encoded copies of data blocks. Other rules may apply when determining whether a data block can be deleted or recycled. A block service may discard a block from a write group if the block is not in use for the DPS of the write group. A block service may discard an unencoded parity block if the block is not in use by any DPS or the maximum encoded/unencoded replica count for all of the block's DPSs is less than the current replica count.

Additionally, block services may follow certain rules during read operations. Illustratively, a block service hosting a copy of a data block may return an unencoded copy if an unencoded copy exists. A block service storing an encoded copy of the block may return an encoded copy if no unencoded copy of the block exists. However, an encoded copy may not be returned if the DPS of the encoded copy is incompatible with a DPS indicated in a read request. For example, if a 4+2 DPS scheme is specified in a read request, then a 4+1 encoded copy may not be returned. If the DPS for the encoded copy has an encoded replica count (e.g., the k value of an erasure coding scheme such as the 3 in a 5+3 scheme) that is greater than or equal to the applicable DPS specified in the read request, then the encoded copy can be returned.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    generating a data structure associating data blocks with each of a plurality of data protection schemes supported by a distributed storage system having a cluster of storage nodes, wherein each of the plurality of data protection schemes is configurable on a per volume basis and has a data integrity guarantee;
    determining a first data protection scheme and a second data protection scheme are concurrently employed for a first data block of a first volume and a second volume, respectively, of the cluster using the data structures, wherein the first data protection scheme and the second data protection scheme have a first data integrity guarantee; and
    applying, based on a policy, one of (1) reducing storage of redundant information in the storage nodes of the cluster for the first data block in accordance with the second data protection scheme, and (2) maintaining storage of redundant information of the first data block to improve performance, wherein the first data protection scheme is replication and the second data protection scheme is a first erasure coding.

2. The method of claim 1, wherein reducing storage of redundant information for the first data block in accordance with the second data protection scheme further comprises deleting one or more copies of the first data block.

3. The method of claim 2, wherein maintaining storage of redundant information to improve performance avoids parity computation of the first erasure coding.

4. The method of claim 1, wherein generating the data structure associating data blocks for each of a plurality of data protection schemes supported by the distributed storage system further comprises generating a Bloom filter for data blocks to which the associated data protection scheme applies.

5. The method of claim 1, wherein generating the data structure identifying data blocks for each of the plurality of data protection schemes further comprises determining which volumes utilize the first data block.

6. The method of claim 1, further comprising updating a data protection bit mask associated with the first data block to indicate that one of the first data protection scheme and the second data protection scheme is removed from association with the first data block.

7. The method of claim 1, further comprising:
    determining a third data protection scheme is associated with the first data block using the data structures, wherein the third data protection scheme has a second data integrity guarantee greater than the first data integrity guarantee, wherein the third data protection scheme is a second erasure coding; and
    reducing, based on the policy, the storage of redundant information for the first data block in accordance with the third data protection scheme.

8. The method of claim 1, further comprising:
    distributing redundant information from the first and second data protection schemes across the nodes of the clusters according to a hash.

9. The method of claim 1, further comprising:
    scaling out the cluster by adding a storage node;
    rebalancing the first data block and the redundant information for the first data block within the scaled out cluster.

10. A system comprising:
    a cluster of storage nodes, each respective storage node including a storage device coupled to a processor, wherein execution by the processor of instructions contained on the storage device causes the cluster to:
        generate a data structure associating data blocks with each of a plurality of data protection schemes supported by the storage node, wherein each of the plurality of data protection schemes is configurable on a per volume basis and has a data integrity guarantee;
        determine first and second data protection schemes are concurrently employed for a first data block of a first volume and a second volume, respectively, of the cluster using the data structures, wherein the first data protection scheme has a same data integrity guarantee as the second data protection scheme, wherein the first data protection scheme is replication and the second data protection scheme is erasure coding;
        perform, based on a policy, one of:
            (1) generation of one or more encoded blocks according to the erasure coding for a group of blocks including the first data block, and marking as unused replicas of the group of blocks unnecessary to maintain the data integrity guarantee; and
            (2) maintaining storage of unencoded replicas of the first data block to improve performance and maintaining the data integrity guarantee.

11. The system of claim 10, wherein said generation of one or more encoded blocks according to the erasure coding of the group of blocks further includes recycling the unused replicas of the group of blocks unnecessary to maintain the data integrity guarantee.

12. The system of claim 10, wherein generation of the data structure associating data blocks for each of a plurality of data protection schemes supported by the storage node further includes generating a Bloom filter for data blocks to which the associated data protection scheme applies.

13. The system of claim 10, wherein generation of the data structure associating data blocks with each of the plurality of data protection schemes further includes determining which volumes utilize the first data block.

14. The system of claim 10, wherein the instructions further cause the cluster to update a data protection bit mask associated with the first data block to indicate that the first data protection scheme is removed from association with the first data block.

15. The system of claim 10, further comprising:
an additional storage node added to scale out the cluster, wherein the program instructions are further configured to rebalance the first data block and the encoded blocks within the scaled out cluster.

16. The system of claim 10, wherein the instructions further cause the cluster to:
store the first data block in a first storage node of the cluster, the first storage node selected according to a hash function applied to the first data block.

17. The system of claim 16, wherein the instructions further cause the cluster to:
store at least one of the encoded blocks in a second storage node of the cluster, the second storage node selected according to the hash function applied to the at least one of the encoded blocks.

18. A non-transitory computer readable medium containing executable program instructions, which when executed by a processor of a storage node in a cluster of a distributed storage system, cause the storage node to:
generate a data structure associating data blocks with each of a plurality of data protection schemes supported by the distributed storage system, wherein each of the data protection schemes is configurable on a per volume basis and has a data integrity guarantee;
determine a first data protection scheme and a second data protection scheme are concurrently employed for a first data block of a first volume and a second volume, respectively, of the cluster using the data structures, wherein the first data protection scheme and the second data protection scheme have a first data integrity guarantee; and
apply, based on a policy, one of (1) reduce storage of redundant information in the storage nodes of the cluster for the first data block in accordance with the second data protection scheme and (2) maintain storage of redundant information for the first data block to improve performance, wherein the first data protection scheme is replication and the second data protection scheme is a first erasure coding.

19. The non-transitory computer readable medium of claim 18, wherein generation of the data structure associating data blocks for each of the plurality of data protection schemes supported by the distributed storage system comprises generating a Bloom filter for data blocks to which the associated data protection scheme applies.

20. The non-transitory computer readable medium of claim 18, wherein the executable program instructions further cause the storage node to update a data protection bit mask associated with the first data block to indicate that one of the first data protection scheme and the second data protection scheme is removed from association with the first data block.

* * * * *